United States Patent [19]

Irwin

[11] Patent Number: 5,543,492

[45] Date of Patent: Aug. 6, 1996

[54] HYDROLYSIS-RESISTANT ARAMIDS

[75] Inventor: Robert S. Irwin, Wilmington, Del.

[73] Assignee: E. I. Du Pont de Nemours and Company, Wilmington, Del.

[21] Appl. No.: 399,330

[22] Filed: Mar. 6, 1995

[51] Int. Cl.$^6$ ............................ C08G 69/26; C08G 69/32
[52] U.S. Cl. .................. 528/335; 528/310; 528/329.1;
528/330; 528/331; 528/338; 528/339; 528/348
[58] Field of Search ........................ 528/330, 339,
528/331, 335, 338, 329.1, 310, 348; 428/396, 474.5

[56] References Cited

U.S. PATENT DOCUMENTS

| | | | |
|---|---|---|---|
| 3,063,966 | 11/1962 | Kwolek | 528/335 |
| 3,354,127 | 11/1967 | Hill, Jr. et al. | 528/335 |
| 3,673,143 | 6/1972 | Bair et al. | 528/335 |
| 4,308,311 | 12/1981 | Ogawa et al. | 428/215 |
| 4,507,467 | 3/1985 | Shimada et al. | 528/348 |
| 5,212,257 | 5/1993 | Irwin | 528/324 |
| 5,212,258 | 5/1993 | Irwin | 525/432 |
| 5,219,898 | 6/1993 | Irwin | 524/104 |
| 5,292,856 | 3/1994 | Irwin | 528/331 |
| 5,310,861 | 5/1994 | Irwin | 528/339 |
| 5,334,693 | 8/1994 | Irwin | 528/339 |
| 5,346,985 | 9/1994 | Irwin | 528/331 |

OTHER PUBLICATIONS

Ballauf, M. et al, *J. Polymer Sci. Part A Polymer Chem.*, 31, 1509–1619, Jan.,(1993).

Clauss, J. et al, *Macromolecules*, 25, 5208–5214, Mar., (1992).

Muller, W. T. et al, *Macromolecules*, 25,(11),2825–2829, May,(1990).

Damman, S. B. et al, *Polymers for Advanced Technogies*, 5, 615–517, (1994).

*Primary Examiner*—Samuel A. Acquah
*Assistant Examiner*—P. Hampton-Hightower

[57] ABSTRACT

Aramid polymers with small amounts of alkyl- and/or alkoxy-substitution on their aromatic diamine and/or aromatic diacid monomeric units are disclosed. Such aramid polymers show improved properties compared to similar aramids without the substitution. The aramids described herein are useful for films or fibers, for example, as employed in the manufacture of packaging, ropes, filter bags, or composites. The invention also includes a process for making such polymers, involving subjecting fibers or films made from such aramid polymers to heat treatment under tension.

22 Claims, No Drawings

HYDROLYSIS-RESISTANT ARAMIDS

FIELD OF THE INVENTION

This invention involves aramid polymers with small amounts of alkyl-and/or alkoxy-substitution on their aromatic diamine and/or aromatic diacid monomeric units. When made into fibers or films and subjected to heat treatment under tension, such aramid polymers show improved properties compared to similar aramids without the substitution. The invention also includes a process for making such polymers.

TECHNICAL BACKGROUND

Aramids, particularly those that can be cast as films or spun into fibers, can show poor stability, as measured for retention of tenacity, when exposed to conditions favoring hydrolysis, for example, aqueous alkaline conditions. This may result in diminished performance, particularly during certain industrial uses of these polymers. It would be desirable to enhance the tenacity retention of aramids while, at the same time, maintaining other useful properties typically associated with aramids, such as their excellent performance characteristics under high-temperature.

Relatively high levels of alkoxy substitution has been used to increase the meltability of aramids which, however, has caused deterioration of characteristic aramid properties. See, for example, Ballauf et al., *J. Polymer Sci. Part A. Polymer Chem.*, 31, p. 1609–19 (1993). An increase in aramid solubility in comparable, highly substituted aramids is described by Clauss et al., *Macromolecules,* 25, p. 5208–14 (1992). The use of highly substituted aramids in films is described by Damman et al., *Polymers for Adv. Technologies,* 5, p. 615–17 (1994).

The present applicant has found that the incorporation of relatively low levels of alkoxy and/or alkyl substitution along the chain of an aramid copolymer, as dislosed herein, can surprisingly improve the hydrolytic stability of the copolymer, but does not adversely affect the excellent high-temperature and other properties typically associated with aramids. Following synthesis of the novel copolymers herein described, the copolymers may be subsequently subjected to heat treatment under tension as part of a commercial process.

SUMMARY OF THE INVENTION

This invention concerns an aramid consisting essentially of repeat units of the formula:

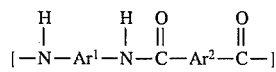

and

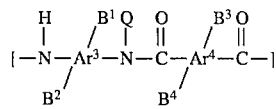

wherein each $Ar^1$, $Ar^2$, $Ar^3$ and $Ar^4$ is independently an arylene having 6 to 12 carbon atoms; repeat unit (II) is about 2 to 8 mole percent of said aramid and repeat unit (I) is about 98 to about 92 mole percent of said aramid;

each $B^1$, $B^2$, $B^3$, and $B^4$ is independently H, an n-alkoxy group containing 6 to 18 carbon atoms, or an n-alkyl group containing 6 to 18 carbon atoms; and Q is H or an n-alkyl group containing 6 to 18 carbon atoms;

provided that, for repeat unit II, at least one of $B^1$, $B^2$, $B^3$, $B^4$ and Q is n-alkoxy or n-alkyl; and that no more than two of $B^1$, $B^2$, $B^3$, $B^4$ and Q are selected from the group consisting of n-alkyl and n-alkoxy.

The invention also is directed to a process for preparing an aramid product comprising heat treating, trader tension, an aramid as described above.

DETAILS OF THE INVENTION

Methods of synthesizing aramids are generally known to those skilled in the art. A common method for making them is to react an aromatic diacid halide with an aromatic diamine. See, for example, H. Mark et al., ed., *Encyclopedia of Polymer Science and Engineering.*, 2d Ed., Vol. 11, p. 394–405 (John Wiley and Sons, New York, 1988). According to the present invention, the aramids are preferably made from repeat units derived from aromatic diamines and aromatic diacids, with minor amounts (2 to 8 mole percent) of alkyl- and alkoxy-substitution on some of the repeat units or the amide nitrogen. For example, the compound 2,5-bis(n-dodecoxy)terephthaloyl chloride can provide the latter repeat units. Its synthesis is described in Example 1 below. This compound can be employed to yield an aramid with 2 to 16 n-alkyl or n-alkoxy groups per 100 repeat units, attached either to the arylene ring or to the amide nitrogen, preferably 2 to 8 such groups, and more preferably 2 to 4 such groups per 100 repeat units. These n-alkyl and n-alkoxy groups preferably contain 6 to 18 carbon atoms, more preferably 8 to 12 carbon atoms. It is preferred, when forming a fiber, that the molecular weight of the polymer be high enough for fiber forming.

The aramids described herein are useful as fibers, for example, as employed in the manufacture of ropes, filter bags and composites. The aramids described herein are also useful as films. The present aramids can show desirable properties such as heat resistance and low elongation. It has been found that the present aramids, preferably after subjecting them to processing involving tensioned heat treatment, can exhibit surprisingly improved hydrolytic stability. By "tensioned heat treatment" is meant placing the aramid fiber or film under a load which is about 10% of the break load, preferably about 25% of the break load, and more preferably about 50% of the break load. This load should be sufficient to provide an increase in length, for example, of about 0.3%, when the aramid is heated briefly (e.g., about 30 sec). Heating temperatures are typically in the range of 300° C. to 500° C., depending on the polymer and its softening or decomposition temperatures. Lower temperatures may also be useful. Poly(p-phenyleneterephthalamide) or PPD-T homopolymer has been shown to undergo negligible extension under similar conditions. See H. Mark, supra, for a description of a spinning and drawing process and of a film casting process.

Without wishing to be bound by theory, it can be theorized that when the copolymer aramids are subjected to heat treatment under tension (i.e., drawing), the polymer elongates slightly and crystallizes with at least some of the pendant groups blocking the pore structure by either folding into the pores themselves or by partially cleaving and then entering the pores. This may help block any hydrolyzing material from entering the aramid matrix, rendering the aramid more resistant to hydrolytic attack and resulting in improved tensile strength.

The present aramid may comprise other monomers. The present aramid, for example, may consist essentially of the recited repeat units plus normal impurities, small amounts of other repeat units (up to 10 percent, preferably less than 5 percent by mole) which, however, do not change the essential properties of the aramid, end groups, etc. The present aramid, in a composition, can also contain additives such as fillers, colorants, reinforcers, antioxidants, etc.

The present aramids contain arylene groups. By the term "arylene" is meant a divalent radical derived from an aromatic hydrocarbon, containing at least one carbocyclic aromatic ring in which the two free valencies are to aromatic carbon atoms on the ring. In this invention, the arylene group ring(s) may be fused, bonded covalently when more than one ring is present, and/or attached via ether, alkylene or alkylidine groups. Preferred arylene groups are p-phenylene and m-phenylene.

One preferred substitution pattern on the arylene group is 2,5-substitution. By 2,5-substitution is meant substitutents attached to an aromatic ring at the numbered positions below:

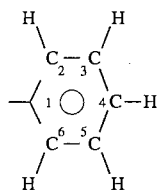

where the polymer chain includes the "1" position and, preferably, either "3" or "4" when the arylene group is a phenylene.

The methods of measuring tensile properties, apparent crystallite size, and orientation angle are described in commonly assigned U.S. Pat. No. 5,212,258, which is hereby incorporated by reference in its entirety. The procedure for measuring inherent viscosity is given in U.S. Pat. No. 3,673,143, col. 17, lines 10 et seq., which is hereby also incorporated by reference in its entirety. In the following Examples, the following abbreviations may be used:

- $Do_2TCl$ refers to 2,5-bis(n-dodecoxy)terephthaloyl chloride.
- PPD-T refers to p-phenylenediamine terephthalate.
- MPD-I refers to m-phenylenediamine isophthalate.
- DMAc refers to N,N-dimethylacetamide.
- NMP refers to N-methylpyrrolidone.
- gpd refers to grams per denier.
- 2,6N refers to 2,6-naphthalenedicarboxylic acid.
- ACS refers to apparent crystallite size.
- OA refers to orientation angle.
- $n_{inh}$ refers to inherent viscosity.
- 3,4'-POP refers to 3,4'-oxydianiline

EXAMPLE 1

This example illustrates the synthesis of 2,5-bis(n-dodecoxy)terephthaloyl chloride (coded $Do_2TCl$). A stirred mixture of diethyl 2,5-dihydroxyterephthalate (300 g; 1.18 mole), $K_2CO_3$ (375 g; 2.7 mole), 1-bromodecane (1470 g; 5.90 mole) and acetone (7.0 L) was heated at reflux for 12 hr. After filtration of the cooled mixture to remove salts, the filtrate was concentrated in vacuo to an oil. This was purified, by elution through a silica gel column, with, first, hexane and then hexane-ethyl acetate (9:1), followed by crystallization from ethanol. The yield was 491 g (70%).

The latter reaction product (473.4 g; 0.801 mole) in 30% aqueous KOH (1690 mL) was heated at reflux for 4 hr., cooled, and neutralized with molar aqueous HCl (8.0 L). The product was filtered, washed with water, dried, and crystallized from ethanol (40 L). The yield was 288 g (67%); the m.p. was 132°–3° C. (lit. 128° C.).

The latter product, 2,5-bis(n-dodecoxy)terephthalic acid (288 g; 0.539 mole), through chloride (1200 mL), and a few drops of pyridine, was heated at reflux for 4 hrs. The $SOCl_2$ was distilled off and the residue crystallized from toluene (700 mL). The product was filtered, washed with hexane, and dried to give 254 g (82%) of $Do_2TCl$, m.p. 63°–4° C. (lit. 60° C.).

EXAMPLE 2

This example illustrates the synthesis, spinning, heat-treatment, and hydrolytic stability of PPD-T/$Do_2T$ (95/5). The synthesis was as follows. The reactant p-phenylenediamine (21.60 g; 0.20 mole) was dissolved in a preprepared solution of anhydrous $CaCl_2$ (31.1 g; 0.28 mole) in anyhydrous NMP (330 g) in a resin kettle fitted with a stirrer, slow purge of dry nitrogen, provision for solids addition, thermometer, and external cooling bath. $Do_2TCl$ (5.71 g; 0.02 mole) and terephthaloyl chloride (38.57 g; 0.19 mole) were added all at once to the stirred solution at 5° C.; temperature rose to ambient from heat of reaction. Very rapidly the solution built up a high degree of viscosity, then transferred to a yellow, opaque, gel-like mush which was unstirrable. This was allowed to sit 2 hr. at 21° C. It was then combined with excess cold water in a blender, filtered, thoroughly washed with water, and dried in a vacuum for 48 hrs. at 100° C. with a slow flow of nitrogen to provide 50.7 g (99%) of fibrous, tan-colored polymer, of inherent viscosity 4.08 dL/g in 100% $H_2SO_4$.

The spin dope preparation was as follows. An Atlantic® mixer was purged 1.5 hours with dry nitrogen at 80° C. At 21° C., under nitrogen, it was charged with 166.2 g, 100% $H_2SO_4$, then cooled by external application of dry ice/acetone with stirring to from $H_2SO_4$ "snow". Polymer (40.0 g) was added to the "snow" under nitrogen and stirring continued for 30 min. while temperature increased to 21° C., and for a further 60 min. while raising it to 68° C. Final mixing at 65° C. under applied vacuum served to remove bubbles, before the solution was transferred to a spinning cell.

The spinning was as follows. The 19.4% solution was maintained at 60° C. for 30 min. to allow temperature equilibration. It was then extruded through a spinneret consisting of 10 holes, each of 0.003 in. diameter and 0.009 in. length at a total throughput ranging from 0.95 to 1.83 mL per min., at 320 to 530 psi and a spinneret temperature of 59° C. The spinneret pack contained a Dynalloy™ X-5 filter supported by 20 mesh stainless steel screens. The extrudate passed through a 0.5 cm air gap at ambient temperature into a water coagulation bath at 3° C. for a distance of 47 cm and wound up at rates ranging from 97 to 175 m/min., corresponding to a spin-stretch factor of 3.5 to 7.0 and calculated filament deniers of 2.0 to 4.0. The wound up fibers were allowed to soak in water at 21° C., with daily changes of water, to extract residual acid. The inherent viscosity of as-spun fiber was 4.18 dL/g in 100% $H_2SO_4$. The averages of 5 filament tensile properties (Tenacity/Break Elongation/Modulus) ranged from 17.1 gpd/5.7%/307 gpd (with maximum at 19.5/5.8/322) to 16.3/6.5/264.

The drawing was as follows. Fibers were air-dried at ambient temperature and stretched by hand across a 1.0" diameter heated shoe up to 3.3%. PPD-T homopolymer is essentially unstretchable. The differences in average tensile properties is shown in Table 1 below for averages of 5 specimens.

TABLE 1

| Draw Condition | As Spun | | | Drawn | | |
|---|---|---|---|---|---|---|
| | T(gpd) | E(%) | M(gdp) | T(gdp) | E(%) | M(gpd) |
| 3.3X/456° C. | 16.3 | 6.5 | 205 | 14.2 | 2.1 | 697 |
| 3.3X/480° C. | 16.3 | 6.5 | 205 | 12.8 | 1.7 | 704 |

To determine hydrolytic stability, fibers were immersed in 10% aqueous NaOH at 95°–100° C. for 20 hrs. The change in properties is shown in Table 2 for the average of 5 specimens.

TABLE 2

| Fiber | Before Hydrolysis | | | After Hydrolysis | | | % Tenacity Retained |
|---|---|---|---|---|---|---|---|
| | T | E | Mi | T | E | Mi | |
| As-spun: | | | | | | | |
| $n_{inh}$ = 4.1 dL/g | 15.9 | 6.3 | 252 | 5.3 | 2.4 | 255 | 33% |
| Drawn: | | | | | | | |
| 1.03X/405° | 13.7 | 1.9 | 716 | 14.9 | 2.7 | 554 | 100% |

EXAMPLE 3

This example illustrates the synthesis, spinning, heat-treatment and hydrolytic stability of PPD-T/2,6N/Do$_2$T (85/10/5). The synthesis was as follows. As per Example 2, a solution of PPD (21.60 g; 0.20 mol.) in NMP (330 g) containing dissolved CaCl$_2$ (31.1 g) was treated with a mixture of terephthaloyl chloride (34.51 g; 0.17 mol.), Do$_2$TCl (5.71 g; 0.01 mol) and 2,6-N (5.06 g; 0.02 mol.) to give a rubbery gel. Polymer was isolated by treatment with excess water in a blender. Inherent viscosity was 4.54 dL/g in 100% H$_2$SO$_4$.

This was dissolved as a 19.4% dope in H$_2$SO$_4$ as described previously and spun through a 10-hole spinneret with 0.05 in. diameter and 0.15" length, at 54° C., via a 0.4 cm air gap into water at 3° C, and fibers wound up at 136–160 m/min. Fibers were hand-stretched up to 3.3X at 400° C. and subjected to the hydrolysis treatment as previously described. Table 3 shows no loss in tenacity in the averages of 5 specimens.

TABLE 3

| Fiber | Before Hydrolysis | | | After Hydrolysis | | | Tenacity Retained |
|---|---|---|---|---|---|---|---|
| | T | E | Mi | T | E | Mi | |
| As-spun | 12.2 gpd | 5.1% | 351 gpd | 6.1 gpd | 5.8% | 378 gpd | 50% |
| 3.3X/ 400 C. | 16.3 | 3.0 | 443 | 16.4 | 3.0 | 594 | 100 |

EXAMPLE 4

This example illustrates the V-polymerization, spinning and heat treatment of PPD-T/Do$_2$T (92.5/7.5). The compound V-phenylenediamine (20.35 g; 0.188 mol.) and NN-diethylaniline (56.2 g; 0.376 mol., redistilled over P$_2$O$_5$) were dissolved in NMP (320 mol) containing predissolved CaCl$_2$ (30 g). This stirred solution was treated with Do$_2$TCl (8.07 g; 0.014 mol) and terephthaloyl chloride (35.38 g; 0.174 mol) at 5° C. This rapidly formed a gel or crumb which was allowed to stand 2 hrs. Inherent viscosity of a precipitated isolated specimen was 4.61 dL/g. (In the absence of NN-diethylaniline, as a HCl acceptor to accelerate reactivity, I. V. was limited to 3.7 dL/g).

The isolated, dried polymer was dissolved as a 19.6% solids solution in 100% H$_2$SO$_4$, using the "snow" technique of Example 1, and the solution stirred 5 hr. at 75° C. It was air-gap spun, as before, with fiber wound up at 120 m/min. Specimens were stretched by hand across a heated shoe by up to 5% as in Table 4 below. Averages of 5 breaks are reported, with the highest tenacity in parentheses.

TABLE 4

| Fiber Treatment | Tenacity (gpd) | Elongation (%) | Modulus (gpd) | X-Ray Data | |
|---|---|---|---|---|---|
| | | | | ACS | OA |
| As-spun | 12.1 (12.9) | 4.3 (4.4) | 381 (429) | 28A | 17° |
| 2% at 400° C. | 14.5 (16.5) | 2.6 (2.5) | 680 (790) | — | — |
| 5% at 425° C. | 15.0 (17.5) | 2.7 (3.1) | 645 (672) | — | — |
| 5% at 450° C. | 11.3 (15.0) | 2.0 (2.5) | 640 (690) | 74A | 10.8° |

X-ray diffraction shows significant improvements in crystallinity and orientation angle on heat treatment. Improved orientation is also reflected in a straightening of the stress-strain curve.

EXAMPLE 5

This example illustrates 3,4POP/PPD(50/50)-T/Do$_2$T(95/5) synthesis, film casting, and fiber drawing of an organo-soluble coaramid. A stirred solution of p-phenylenediamine (4.75 g; 0.044 mol.) and 3,4'-oxydianiline (80.0 g; 0.044 mol.) in NMP (225 g) containing predissolved CaCl$_2$ (9.68 g), at 5° C., was treated with a mixture of terephthaloyl chloride (16.97 g; 0.0836 mol) and Do$_2$TCl (2.51 g; 0.0044 mol.). Viscosity built up rapidly. After 40 min. the viscous solution was treated with CaO (4.93 g; 0.088 mol) to give a 9.8% dope; I.V.=2.16 by dilution with NMP.

Films were cast on clear glass plates at 21° C. with 0.015 in. and 0.020 in. doctor's knives and dried 15 hr. in a vacuum oven at 100° C., under a slow nitrogen bleed. The films were soaked in water, separated from the glass plates, then clamped onto aluminum plates and air-dried at 21° C. The dry films were divided into 0.25" wide strips and maximally hard-drawn over a 1.0 in diameter hot pin at various temperatures to provide increased tensile strengths as shown in Table 5, for averages of at least 6 specimens.

TABLE 5

| Film Treatment | Tenacity (gpd) | Elongation (%) | Modulus (gpd) |
|---|---|---|---|
| As cast | 0.74 | 31 | 18.6 |
| 2X/270° C. | 3.9 | 3.6 | 99 |
| 4X/340° C. | 6.1 | 3.2 | 184 |
| 4X/390° C. | 6.2 | 3.6 | 163 |

EXAMPLE 6

This example illustrates the synthesis, spinning and drawing of MPD-I/Do$_2$T (96/4). The polymer synthesis and spin dope preparation was as follows. To a stirred solution of m-phenylenediamine (48.60 g; 0.45 mol.) in DMAc at 5° C. was added isophthaloyl chloride (87.70 g; 0.432 mol.) and Do$_2$TCl (10.28 g; 0.018 mol.). After 1 hr. of stirring at ambient temperature, CaO (25.2 g; 0.45 mol.) was mixed in to provide a clear viscous solution. The IV was 1.52 by dilution with DMAc.

The dry spinning was as follows. The above spin-dope, contained in a supply vessel at room temperature, was pumped through a heat exchanger at 85° C., and through a spinneret pack (containing sequentially as an assembly of screens: 1×50 mesh, 1×100 mesh; 2×200 mesh, 1×100 mesh, 1×50 mesh) a 205 psi pressure and through a 10-hole spinneret (each of 0.0065 in. diameter), into a co-current nitrogen flow at 200° C. and 3.3 cubic ft./min. within a dry-spinning 25 ft. column heated at 200° C. Fibers were treated with water as a finish and wound up on bobbins at 130 m/min. across feed rolls at 125 m/min. Bobbins were soaked overnight in water to remove residual DMAc and CaCl$_2$.

The drawing was as follows. The wet yarn was fed at, typically, 3.0–4.0 m/min. from feed roll (10 wraps) through water at 90° C., to a second roll (6 wraps) at 9.0 m/min. and 130° C. Thence it passed across a hot shoe at 325° C. to a wind-up roll (5 wraps) at room temperature and 12–24 m/min. for a total draw ratio of, typically, 6X. This fiber exhibited a wide-angle X-ray ACS of 37A (typical for MPD-I homopolymer) and an orientation angle of 14.2°. A typical average "denier per filament/tenacity/elongation/modulus/toughness" was 2.4/3.8 gpd/56%/62 gpd/1.47 gpd.

EXAMPLE 7

This example illustrates the synthesis of PPD-T/Do$_2$T (90/10). As per Example 2, a stirred solution of p-phenylenediamine (21.60 g; 0.20 mol) in NMP (330 mol) containing dissolved CaCl$_2$ (31.0 g) at 5° C. was treated with a mixture of terephthaloyl chloride (12.79 g) and Do$_2$TCl (4.00 g), followed by the remainder of their intermediates (23.75 g and 7.42 g, respectively) after 10 min. At no point did the mixture become a clear solution, but after 30 min. in had become an unstirrable yellow mush. After 1.5 hr at 21° C. the mush was precipitated with cold water and the polymer filtered off, washed and dried. The fibrous beige-colored powder had an IV of 2.41 dL/g in 100% H$_2$SO$_4$.

What is claimed is:

1. An aramid comprising repeat units of the formula

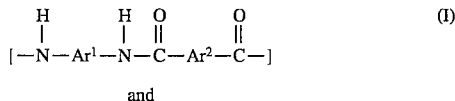

and

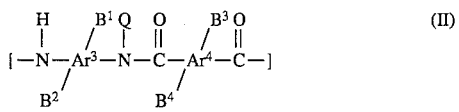

wherein each Ar$^1$, Ar$^2$, Ar$^3$ and Ar$^4$ is independently an arylene having 6 to 12 carbon atoms;

repeat unit (II) is about 2 to about 8 mole percent of said aramid and repeat unit (I) is about 98 to about 92 mole percent of said aramid;

each B$^1$, B$^2$, B$^3$, and B$^4$ is independently H, an n-alkoxy group containing 6 to 18 carbon atoms, or an n-alkyl group containing 6 to 18 carbon atoms; and Q is H or an n-alkyl group containing 6 to 18 carbon atoms;

provided that, in accordance with the formula for repeat unit (II), at least one of B$^1$, B$^2$, B$^3$, B$^4$ and Q is n-alkoxy or n-alkyl; and that no more than two of B$^1$, B$^2$, B$^3$, B$^4$ and Q are selected from the group consisting of n-alkyl and n-alkoxy.

2. The aramid as recited in claim 1 wherein Ar$^1$, Ar$^2$, Ar$^3$ and Ar$^4$ are each independently p-phenylene or m-phenylene.

3. The aramid as recited in claim 1 wherein Ar$^1$, Ar$^2$, Ar$^3$ and Ar$^4$ are essentially all p-phenylene or all m-phenylene.

4. The aramid as recited in claim 2 wherein B$^1$ and B$^2$ are 2,5-substituents of Ar$^3$, and B$^3$ and B$^4$ are 2,5-substituents of Ar$^4$.

5. The aramid as recited in claim 1 wherein said aramid has 2 to 8 n-alkyl or n-alkoxy groups per 100 repeat units.

6. The aramid as recited in claim 1 wherein each n-alkyl group or n-alkoxy group contains 8 to 12 carbon atoms.

7. The aramid as recited in claim 1 wherein Ar$^1$, Ar$^2$, Ar$^3$ and Ar$^4$ are all p-phenylene, and said aramid has an average crystallite size of about 35 to about 115 Angstroms.

8. The aramid as recited in claim 1 wherein Ar$^1$, Ar$^2$, Ar$^3$ and Ar$^4$ are all p-phenylene or all m-phenylene, wherein said aramid has 2 to 8 n-alkyl or n-alkoxy groups per 100 repeat units, and wherein each n-alkyl group or n-alkoxy group contains 8 to 12 carbon atoms.

9. A fiber of the aramid as recited in claim 1.

10. The fiber of claim 9 wherein said fiber has been subjected to heat treatment under tension.

11. A film of the aramid as recited in claim 1.

12. The film of claim 11 wherein said film has been subjected to heat treatment under tension.

13. A process for preparing an aramid fiber or film comprising heat treating under tension:

an aramid comprising repeat units of the formula

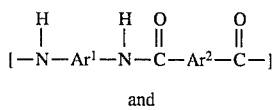  (I)

and

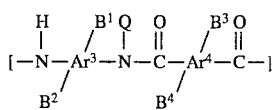  (II)

wherein each $Ar^1$, $Ar^2$, $Ar^3$ and $Ar^4$ is independently an arylene having 6 to 12 carbon atoms;

repeat unit (II) is about 2 to about 8 mole percent of said aramid and (I) is about 98 to about 92 mole percent of said aramid;

each $B^1$, $B^2$, $B^3$ and $B^4$ is independently H, an n-alkyl group containing 6 to 18 carbon atoms, or an n-alkyl group containing 6 to 18 carbon atoms; and Q is H or an n-alkyl group containing 6 to 18 carbon atoms;

provided that, in regard to the repeat unit (II), at least one of $B^1$, $B^2$, $B^3$, $B^4$ and Q is n-alkoxy or n-alkyl, and that no more than two of $B^1$, $B^2$, $B^3$, $B^4$ and Q are selected from the group consisting of n-alkyl and n-alkoxy.

14. The process as recited in claim 13 wherein $Ar^1$, $Ar^2$, $Ar^3$ and $Ar^4$ are all p-phenylene or all m-phenylene.

15. The process as recited in claim 14 wherein $B^1$ and $B^2$ are 2,5-substituents of $Ar^3$, and $B^3$ and $B^4$ are 2,5-substituents of $Ar^4$.

16. The process as recited in claim 13 wherein said aramid has 2 to 8 n-alkyl or n-alkoxy groups per 100 repeat units.

17. The process as recited in claim 13 wherein each said n-alkyl group or n-alkoxy group contains 8 to 12 carbon atoms.

18. The process as recited in claim 13 wherein $Ar^1$, $Ar^2$, $Ar^3$ and $Ar^4$ are all p-phenylene, and wherein said aramid has an average crystallite size of less than 35 Angstroms before heat treatment under tension and 35 to about 115 Angstroms after said heat treatment under tension.

19. The process as recited in claim 13 wherein $Ar^1$, $Ar^2$, $Ar^3$ and $Ar^4$ are all p-phenylene or all m-phenylene, wherein said aramid has 2 to 8 n-alkyl or n-alkoxy groups per 100 repeat units, and wherein each said n-alkyl group or n-alkoxy group contains 8 to 12 carbon atoms.

20. The process as recited in claim 19 wherein an aramid fiber is produced.

21. The process as recited in claim 19 wherein an aramid film is produced.

22. The product of the process as recited in claim 13.

* * * * *